United States Patent [19]

Stevens

[11] Patent Number: 4,853,246

[45] Date of Patent: Aug. 1, 1989

[54] SWEETENED HIGH PROTEIN MILK PRODUCT AND PROCESS FOR PRODUCING SAME

[75] Inventor: Robert F. Stevens, Smyrna, Ga.

[73] Assignee: Tetra Pak Inc., Shelton, Conn.

[21] Appl. No.: 256,411

[22] Filed: Oct. 12, 1988

Related U.S. Application Data

[63] Continuation of Ser. No. 127,226, Dec. 1, 1987.

[51] Int. Cl.$^4$ .......................... A23C 3/02; A23C 9/12; A23G 1/00
[52] U.S. Cl. ..................................... 426/580; 426/42; 426/584; 426/588
[58] Field of Search .................. 426/584, 588, 42, 580

[56] References Cited

U.S. PATENT DOCUMENTS 2,681,858  6/1954  Stimpson ............................. 426/42
4,478,855 10/1984  Dahlen et al. ....................... 426/42
4,497,834  2/1985  Barta .................................... 426/42

OTHER PUBLICATIONS

Tetra Pak, Milk is an almost complete food, pp. 1-4.
Novo Enzymes, Novo Industries, Bagsvaerd Denmark.
Gist-brocades nv. Maxilact, the dairy yeast Lactose, Industrial Div., Delf Holland, pp. 1-6.
Sturge Enzymes, Selby Yorkshire, Eng. pp. 1-2.

*Primary Examiner*—Donald E. Czaja
*Assistant Examiner*—Helen Pratt
*Attorney, Agent, or Firm*—Burns, Doane, Swecker & Mathis

[57] ABSTRACT

The present invention is a process to produce a high protein, sweetened, low fat, reduced lactose dairy product not requiring refrigeration. The process includes the following steps: providing milk which is low in fat content, usually reconstituted powdered skim milk, adjusting the total milk solids to a value of between approximately 10 and 35%, by weight, sterilizing the milk mixture by ultra heat treatment, adding an appropriate amount of lactase to the sterilized milk mixture to digest the lactose over a predetermined period of time at room temperature, adjusting the pH to between 6 and 7 if necessary, and packaging the lactase-milk mixture aseptically. A variety of other ingredients can be added to the mixture including fruits, nuts, flavorings, stabilizers, emulsifiers, vitamins, and minerals. The product is stable at room temperature. It can also be frozen for use as a substitute for ice cream or maintained at a temperature of approximately 4° C. for additional shelf life.

13 Claims, No Drawings

SWEETENED HIGH PROTEIN MILK PRODUCT AND PROCESS FOR PRODUCING SAME

This application is a continuation of application Ser. No. 127,226, filed on Dec. 1, 1987.

BACKGROUND OF THE INVENTION

The present invention is a reconstituted, protein enriched, sweetened, reduced lactose milk product, in the general area of dairy products.

Milk contains only one carbohydrate, lactose. Lactose, or milk sugar, is a disaccharide consisting of the monosaccharides glucose and galactose. Disaccharides cannot be absorbed in the intestine. In most people, an enzyme called lactase is produced which hydrolyses, or splits, lactose into glucose and galactose.

When a person is lactase deficient, they are unable to hydrolyze the lactose to produce glucose and galactose for use as an energy source. The absorption of the other nutrients in the milk is also interfered with. Lactose intolerant people, those people who produce insufficient lactase, suffer substantial physical distress from the production of gas, cramping, and diarrhea due to ingestion of dairy products and subsequent fermentation of the undigested lactose by bacteria residing in the intestine.

Lactose intolerance is found throughout the world. It appears to be the result of genetic factors, age, and perhaps environment. There is a higher incidence of lactose intolerance in people residing in Africa, the Far East and around the Mediterranean and their descendants. The ability to produce lactase declines with age. The highest levels of lactase are produced in children at the time of birth, decreasing through adolescence to levels as low as ten percent of their initial values by the time a person reaches adult age.

Lactose deficiency is treated either by avoidance of all dairy products or treatment of the dairy product with lactase, either before or simultaneously with ingestion. At the present time, lactase is produced commercially by companies including Sturge Enzymes, Selby, North Yorkshire, England, Novo Enzymes, Bagsvaerd, Denmark, Gist-Brocades N.V., Delft, Holland, and Chas. Pfizer Co., Inc. New York, New York. The lactase produced by these particular companies is derived from a yeast common to the dairy industry, *Kluyveromyces fragilis*. Enzyme activity is defined in units (EU), that amount of lactase which produces one micromole of glucose per minute from lactose at pH 6.2, usually at a temperature of 30° C., although this varies with the company.

Lactase, also known as beta-D-galactosidase E.C. 3.2.1.23, is most stable at pH's between about 6 and 9, with optimum activity at pH 6.2. Activity declines rapidly at a pH below about 5.5 and higher than about pH 7.5. The temperature at which the enzyme is maintained also significantly affects activity and stability. The enzyme rapidly declines in stability at temperatures in excess of about 45° C. Lactase requires the presence of two types of cations for maximum effect. $Mn^{++}$ is the most effective divalent cation, activating at $10^{-5}$ to $10^{-4}$ M. $Mg^{++}$ has a somewhat effect at $10^{-30}$ to $10^{-2}$ M. $Zn^{++}$ and $Co^{++}$ also activate the enzyme. At higher concentrations, a monovalent cation is required. 0.1 M $K^+$ is most effective, with $NH4^+$ and $Na^+$ having some effect. $Ca^{++}$ does not activate the enzyme. $Fe^{++}$ inhibits the enzyme, as do quaternary ammonium compounds.

Lactase is routinely added to such dairy products as milk and milk products, fermented dairy products, and whey, whey protein concentrate and whey permeate. The primary reason lactase is added to milk and milk products is to increase their digestibility by lactose-intolerant people. In frozen dairy products, as well as in highly concentrated whey-derived dairy products, lactase is used to produce the monosaccharides which are more soluble and less subject to crystallization than the lactose which causes the frozen or concentrated product to have an undesirable texture. In fermented dairy products such as yogurt, lactase is added to increase the sweetness of the product by converting the lactose to glucose and galactose, without having to add additional sugar.

On a practical basis, the addition of lactase to milk or other dairy products does not yield a 100% lactose free product. With respect to refrigerated milk, lactase is added either by the consumer in his home to a carton of milk which is then mixed well and allowed to sit overnight in the refrigerator before using, or by the dairy prior to pasteurization and packaging. Pasteurization denatures the enzyme so that no further reduction in the level of lactose is achieved. The usual result in both cases is that only about 70% of the lactose is hydrolyzed.

An alternative system has been developed by Tetra Pak, Lausanne, Switzerland. In this system, milk is first sterilized using an ultraheat treatment process consisting of a brief heat shock, approximately 4–8 seconds, preferably 4 seconds, at approximately 140° C. This treatment kills all of the bacteria in the milk. Milk sterilized by this process can be packaged aseptically and maintained for several weeks at room temperature. In the system developed by Tetra Pak, lactase is added to the ultraheat-treated milk prior to packaging via a sterile pump and filter assembly. Since refrigeration is not required, nor any further heat treatment, the enzyme is able to hydrolyze the lactase in the package over several days, resulting in a product containing very little, if any, undigested lactose. Several advantages to the use of lactase to reduce lactose in milk or milk-derived products is readily apparent. In those situations where adequate refrigeration is not a problem, lactase-treated dairy products are available which can be digested by those who would otherwise be deprived of the nutritional advantages of dairy products, as well as the taste of ice cream, milk, cheese, yogurt, sour cream, etc. The Tetra Pak product can be used in those situations where refrigeration is not available or where a product which is 100% lactose free is required.

Unfortunately, the product produced using the ultraheat treatment has one major drawback, particularly when prepared from reconstituted milk. It tastes terrible.

It is therefore an object of the present invention to provide a good tasting, reduced lactose dairy product.

It is another object of the present invention to provide a good tasting, reduced lactose dairy product which does not require refrigeration.

It is a still further object of the present invention to provide a high protein, high vitamin, high mineral, greater than 99% fat-and lactose-free dairy product made using powdered dry milk.

SUMMARY OF THE INVENTION

The present invention is a process, and the product thereof, to produce a high protein, sweetened, reduced lactose dairy product not requiring refrigeration.

The process includes the following steps: providing milk which is low in fat content (less than about 2% to avoid rancidity upon long term storage), usually reconstituted powdered skim milk, adjusting the total non-fat milk solids in the low fat milk to between approximately 10 to 13%, sterilizing the milk mixture by ultra heat treatment, addiing an appropriate amount of lactase to the sterilized milk mixture to digest all of the lactose over a pre-determined period of time at room temperature, adjusting pH to between 6 and 7 if necessary, and packaging the lactase-milk mixture aseptically.

The product may be maintained at room temperature or at a temperature of approximately 4° C. for additional shelf life. Additional ingredients can be added including flavorings, fruits, nuts, minerals, vitamins, emulsifiers, and stabilizers. The digested mixture can be frozen for use as a substititute for ice cream or dried for later reconstitution or use as a food additive.

DETAILED DESCRIPTION OF THE INVENTION

The present invention is a process to produce a sweetened, high protein, vitamin and mineral milk product. There are two important steps: the addition of non-fat milk solids to low fat milk and the digestion of the lactose in these non-fat milk solids with lactase to produce high levels of glucose and galactose. In contrast to other lactase treated dairy products, the taste of the product of the present invention is the result of the combination of the added milk solids and the lactase. The vastly improved flavor is due not only to the products of hydrolysis of the high levels of lactose in the mixture by lactase, glucose and galactose, but also to the flavor imparted by the non-lactose milk solids.

The product produced according to the present invention has multiple applications. Other ingredients can be added such as artificial and natural flavors including vanilla and chocolate, fruits, nuts, vitamins, minerals including calcium, emulsifiers, and stabilizers. The milk product can be frozen for use as an ice cream substitute. It can also be utilized in liquid or dried form as a food additive.

To be used as a dry food additive, the reconstituted-milk solids mixture or non-fat milk solids enhanced low fat milk is ultraheat treated, lactase digested, and dried using techniques available to those skilled in the art such as spray drying or freeze drying. The resulting product is greater than about 96% non-fat, non-lactose milk solids. Hydrolysis of the lactose aids in the use of techniques such as freeze drying due to the increased solubility and decreased crystallinity of the glucose and galactose as compared to lactose. Since treatment of milk by lactase under most prior art conditions does not yield a product which is substantially lactose free (approximately 99-100% lactose free), no lactose free dry milk products have been available prior to the present invention. Even of those that may be completely lactose free, they do not contain the added milk solids and high levels of glucose and galactose.

Skim milk is preferably selected as the starting material since it is readily available and an excellent means for decreasing the calories and cholesterol in milk for those on restricted diets. The desired total milk solids is obtained by adding less water to the powder than is used to produce reconstituted skim milk or by adding additional milk powder to natural or reconstituted milk. Adding dry milk powder prepared from skim milk to the natural or reconstituted milk does not add any additional milk fat to the product of the present invention. However, the percent protein and lactose in skim milk containing added skim milk powder is substantially higher than in natural or reconstituted skim milk. The result is that more glucose and galactose is produced by lactase treatment of the mixture than by treatment of skim or whole, milk due to the combination of the higher percent hydrolysis and higher percent lactose. The higher percent protein in the mixture is unchanged by the addition of the lactase.

The amount of lactase to be added depends upon the pH, the temperature, the percent lactose present in the milk product, and the source and nature of the enzyme. For example, lactase sold by Sturge Enzymes, Hydrolact TM has an activity of 5,000 enzyme units/ml when measured under defined conditions at 30° C. and pH 6.2. In contrast, the Lactozyme TM produced by Novo Enzymes contains 3,000 LAU or Novo lactase units/ml, where 1 LAU is defined as the amount of enzyme which releases one micromole glucose per minute in a solution of 4.75% w/w lactose at pH 6.5, 37° C., over a period of 30 minutes in an enzyme range of 0.035-0.1 LAU/ml in a milk buffer system. Maxilact TM, sold by GistBrocades N.V., comes in three different preparations, a highly purified lactase having 5,000 units/ml, a preparation containing 2,000 units/ml for treatment of whey and fermented dairy products, and a crude lactase preparation for agricultural applications.

The optimum amount of enzyme according to the present invention is determined by measuring the conversion of lactose to lactase as a function of quantity of added enzyme at room temperature over a period of days following addition of the lactase to the ultraheat treated milk product. The advantage of the ultraheat treatment is that it sterilizes the milk and provides a means for keeping the milk product at room temperature. Since enzyme kinetics are temperature dependent, as noted earlier, this allows for a more rapid, complete hydrolysis of the lactose by the enzyme.

In the following example, lactase from three different commercial sources, Sturge, Novo, and Gist-Brocades, was added to milk that had been ultra heat treated and stored at room temperature. Different amounts of each enzyme were added to the milk to compensate for the different specific activities of the solution. For the Sturge enzyme, 75 ml enzyme was diluted by the addition of 2,350 ml buffer. For the Novo enzyme, 112.5 enzyme was added to 2,275 ml buffer. For the Gist-Brocades enzyme, 75 ml enzyme was added to 2,350 ml buffer. The enzyme was added to the milk using the Tetra Lacta TM system manufactured by Tetra Pak. The pump was set with the variator at 3 and the stroke at 4.4, 5.4 and 8.4.

TABLE I

| Enzyme Manufacturer | Degree of hydrolysis ml Undiluted Enzyme per 1,000 ml Buffer | Degree of Hydrolysis 24 Hrs. | 13 Days |
|---|---|---|---|
| Sturge | 50 | 63 | 100 |
| Sturge | 75 | 80 | 100 |

TABLE I-continued

| Enzyme Manufacturer | Degree of hydrolysis ml Undiluted Enzyme per 1,000 ml Buffer | Degree of Hydrolysis 24 Hrs. | 13 Days |
|---|---|---|---|
| Sturge | 100 | 87 | 100 |
| Novo | 75 | 68 | 100 |
| Novo | 112.5 | 82 | 100 |
| Novo | 150 | 89 | 100 |
| Gist-Brocades | 50 | 86 | 100 |
| Gist-Brocades | 75 | 95 | 100 |
| Gist-Brocades | 100 | 97 | 100 |

Complete digestion of the lactose can be obtained with enzyme from all three sources.

In the preferred embodiment, the product of the present invention can be characterized as a sweetened, high protein, low fat milk product having between about 10% and 35% total solids, less than 1% lactose, and less than about 2% low fat milk. In the most preferred embodiment, the milk product contains less than 0.2% lactose, less than 0.2% milk fat, and 10–13% non-fat solids. The product can further include flavorings, vitamins, minerals such as added calcium, fruits, nuts, emulsifiers, stabilizers, be in solution at a temperature ranging from approximately 0° to 40° C., or dried. For example, about 0.162% vanilla can be added to enhance flavor without imparting a vanilla taste.

The following table is a comparison of the product of the present invention with skim milk, low fat milk, and whole milk.

| One U.S. Gallon | Skim Milk | 1% Milk | 2% Milk | 3.3% Whole Milk | 0.9105 lb. Non-Fat Milk Powd. |
|---|---|---|---|---|---|
| Weight (lbs) | 8.64 | 8.60 | 8.60 | 8.60 | 8.833 |
| Protein (g) | 134 | 128 | 130 | 128 | 149 |
| Lactose (g) | 190 | 187 | 187 | 182 | 1 |
| Glucose (g) | — | — | — | — | 215* |
| Galactose (g) | — | — | — | — | *combined |
| Fat (g) | 7 | 41 | 75 | 130 | 3 |
| Calories | 1373 | 1640 | 1952 | 2382 | 1497 |
| Calcium (mg) | 4825 | 4802 | 4763 | 4646 | 5190 |
| Iron (mg) | 2 | 2 | 2 | 2 | 1 |
| Magnesium (mg) | 431 | 547 | 547 | 508 | 454 |
| Phosphorus (mg) | 3962 | 3748 | 3709 | 3631 | 3999 |
| Potassium (mg) | 6511 | 6091 | 6013 | 5935 | 7409 |
| Sodium (mg) | 2040 | 1952 | 1952 | 1913 | 2211 |
| Zinc (mg) | 16 | 15 | 15 | 15 | 17 |
| Ascorbic Acid (mg) | 38 | 39 | 37 | 37 | 28 |
| Thiamine (mg) | 1 | 2 | 2 | 1 | 2 |
| Riboflavin (mg) | 5 | 6 | 6 | 6 | 6 |
| Niacin (mg) | 3 | 3 | 3 | 3 | 4 |
| Pantothenic acid (mg) | 13 | 13 | 1 | 12 | 15 |
| Vitamin B6 (mg) | 2 | 2 | 2 | 2 | 2 |
| Folacin (mcg) | 196 | 195 | 195 | 195 | 207 |
| Vitamin B12 (mcg) | 15 | 14 | 14 | 14 | 17 |
| Vitamin A (mcg) | fort. | fort. | fort. | fort. | 148 IU |

| | SKIM MILK LBS. | 1% MILK LBS. | 2% MILK LBS. | 3.3% MILK | SKIMLAC LBS. |
|---|---|---|---|---|---|
| H2O | 7.83823 | 7.7392 | 7.66458 | 7.55965 | 7.9064982 |
| NON-FAT SOLIDS | 0.78616 | 0.76881 | 0.7695647 | 0.752516 | 0.9195463 |
| FAT | 0.01561 | 0.09111 | 0.16497 | 0.286953 | 0.0068283 |

Modifications and variations of the present invention will be obvious to those skilled in the art from the foregoing detailed description. Such modifications and variations are intended to come within the scope of the appended claims.

I claim:

1. A sweetened, high protein, low fat, reduced lactose milk product comprising between about 10% and 35% total milk solids, less than about 2% milk fat, and less than about 1% lactose, by weight, said product having been produced by increasing the total milk solids in the initial low fat milk, followed by ultraheat treating of the milk solids mixture and addition of lactase to the ultraheat treated milk solids mixture.

2. The low fat, reduced lactose milk product of claim 1 comprising less than 0.2% lactose, less than 0.2% milk fat, and between about 10 to 13% non-fat solids, by weight.

3. The milk product of claim 1 further comprising an ingredient selected from the group consisting of flavorings, fruit, nuts, vitamins, minerals, stabilizers and emulsifiers.

4. The milk product of claim 1 wherein said milk product is frozen.

5. The milk product of claim 1 wherein said milk product is in a dry powder form.

6. A process for producing a sweetened, high protein reduced lactose milk product comprising performing the following steps in the following order:
   (a) providing milk having a fat content of less than about 2%, by weight;
   (b) adjusting the total milk solids in the low fat milk to a level between about 10% to 35%, by weight;
   (c) ultraheat treating the milk solids mixture at approximately 140° C. for between about 4 to 8 seconds; and
   (d) adding an amount of sterile lactase to the ultraheat treated reconstituted milk solids mixture as required to digest approximately 99% of the lactose in the milk mixture at room temperature.

7. The process of claim 6 further comprising adjusting the pH of the low fat milk to the optimum pH for lactase activity prior to adding the lactase.

8. The process of claim 6 further comprising drying the digested milk solids mixture.

9. The process of claim 6 further comprising freezing the digested milk solids mixture.

10. The process of claim 6 further comprising adding to the mixture an ingredient selected from the group consisting of flavorings, fruit, nuts, vitamins, minerals, stabilizers and emulsifiers.

11. The process of claim 6 further comprising adjusting the milk mixture to between about 10% and 13% total milk solids and less than about 0.2% milk fat, by weight, prior to ultra heat treating.

12. The process of claim 6 further comprising digesting the milk mixture with lactase until less than 0.2% lactose is present in the milk mixture.

13. The process of claim 6 wherein the low fat milk is provided by reconstituting skim milk powder.

* * * * *